UNITED STATES PATENT OFFICE.

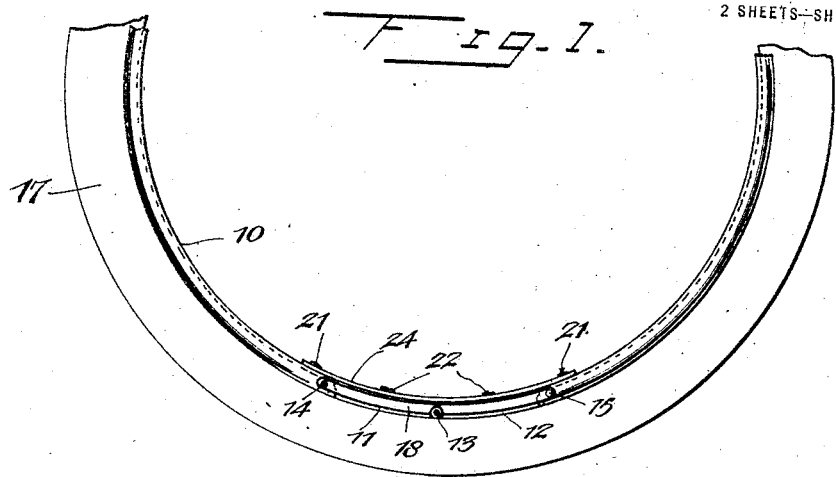
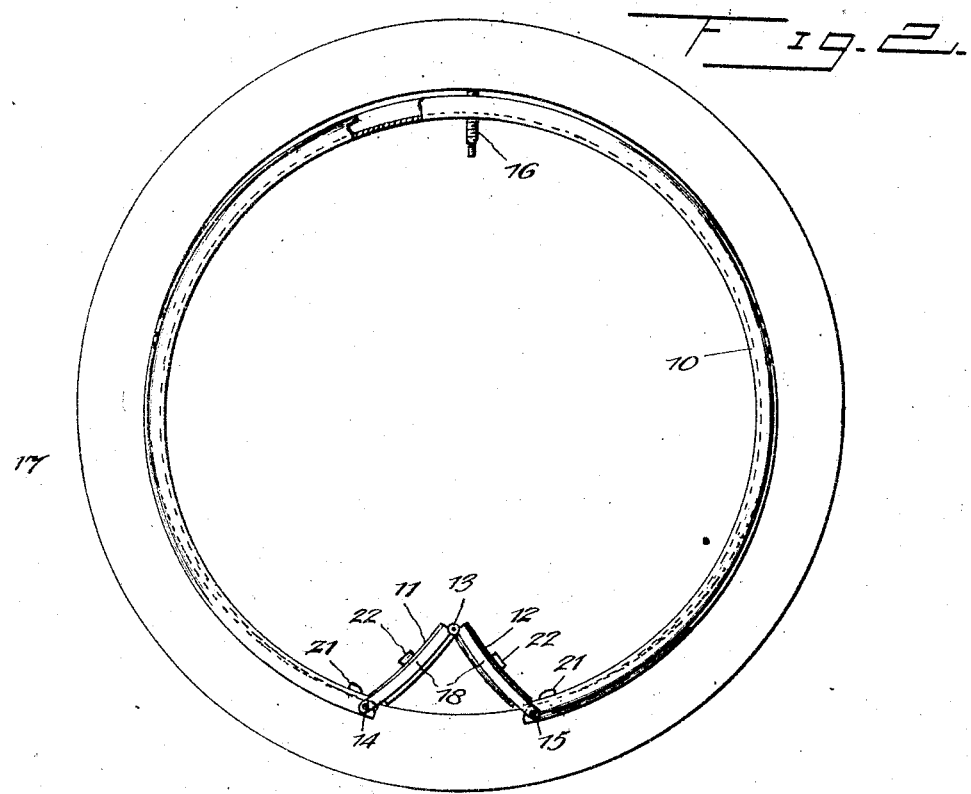

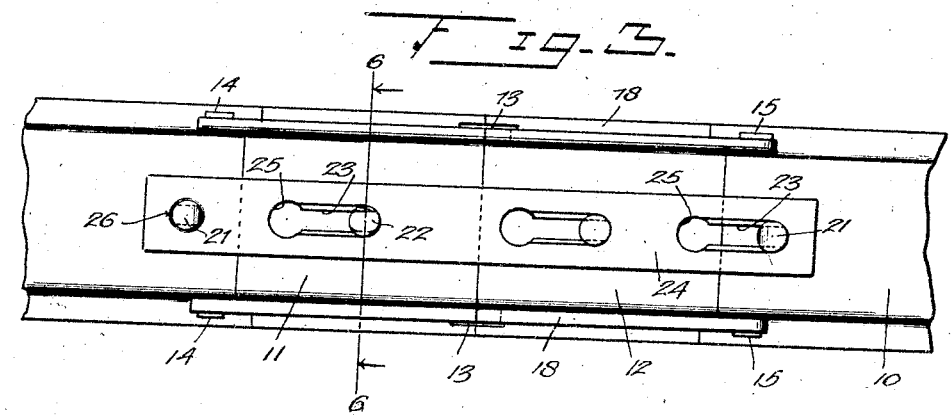
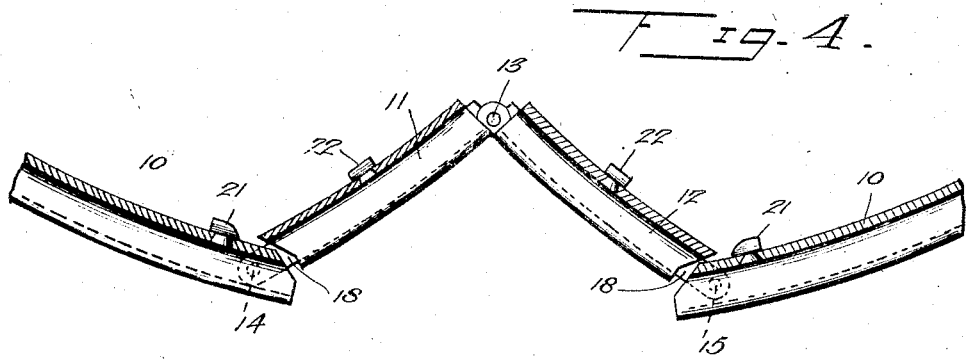
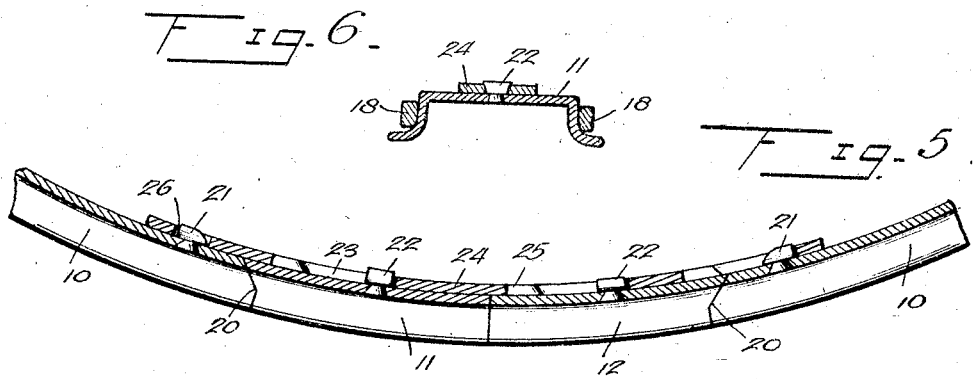

WILLIAM ISAAC HARP, OF GALAX, VIRGINIA, ASSIGNOR OF ONE-FOURTH TO JOHN LINN, ONE-FOURTH TO R. B. TODD, AND ONE-FOURTH TO J. E. TODD, ALL OF GALAX, VIRGINIA.

DEMOUNTABLE RIM.

1,340,894.  Specification of Letters Patent.  Patented May 25, 1920.

Application filed October 18, 1919. Serial No. 331,547.

*To all whom it may concern:*

Be it known that I, WILLIAM I. HARP, a citizen of the United States, and a resident of Galax, in the county of Grayson and State of Virginia, have invented certain new and useful Improvements in Demountable Rims, of which the following is a specification.

My present invention relates generally to demountable rims and more particularly to certain improvements in connection with such rims, whereby they may be reduced and expanded with the expense of minimum power and effort and thus engaged with or disengaged from a tire in materially less time than it is possible to do so in the construction of rim connections now in use.

A further object of my invention is the provision of a rim and rim connection which will admit of ready, easy and quick manipulation and will avoid the necessity of all special tools and implements.

A still further object of my invention is the provision of a rim and rim connection, the construction and arrangement of which will avoid the danger of lateral distortion or displacement and will at the same time avoid all undue strain upon a tire therearound, as well as the valve tube thereof.

A still further object is the provision of a rim and rim connection which will readily lend itself to rigid locking in the effective position, together with a simple effective lock therefor.

A still further object is the provision of a rim and rim connection of which each of the movable parts is of similar construction so as to avoid rights and lefts, simplify manufacture, and economize both in assemblage in the first instance, as well as substitution in its use.

With these general advantages in view, my invention resides in the construction and arrangement of rim connection, to be hereinafter described, with respect to the accompanying drawings which form a part of this specification, and in which:—

Figure 1 is a partial side elevation showing the parts in effective position and illustrating their practical application, Fig. 2 is a side view complete, showing the movable sections sprung inwardly to released position, Fig. 3 is a top plan view of a portion thereof, Fig. 4 is a longitudinal section through the parts shown in Fig. 3, illustrating the yielding sections in the inactive position, Fig. 5 is a similar view showing the yieldable sections in active position, and Fig. 6 is a transverse section taken substantially on line 6—6 of Fig. 3.

Referring now to these figures, my invention proposes a rim, the major portion of which is in a single main section 10, the ends of which are connected by inwardly yielding sections 11 and 12, the latter of which it will be noted are of identical construction. These sections 11 and 12 are hingedly connected to one another at their inner adjacent ends at 13 and their outer ends are hingedly connected at 14 and 15 to the opposite ends of the main section 10, the central hinge connection 13 being formed at a point outwardly beyond the longitudinal centers of the sections 11 and 12 so that when pressed outwardly into the circumferential line of the completed rim as seen in Fig. 1, little if any danger will be experienced of accidental swinging movement of the hinged sections.

The main section 10 has an opening adapted to receive the valve tube 16 of a tire generally indicated at 17, this valve tube receiving opening being located at a point diametrically opposite to the central hinged connection 13 between sections 11 and 12 so that in forcing these sections outwardly to the effective position, the pressure will be equally distributed to the two ends of the main section 10 of the rim and circumferential displacement of the central portion of the latter with respect to the valve tube 16 will be avoided. This overcomes a serious defect in the rim constructions commonly used at the present time, and greatly simplifies the adjustment of the rim within a tire. The fact that the two hinged sections 11 and 12 are of identical construction simplifies manufacture and assemblage of the parts in the first instance to a considerable extent as well as the substitution of parts in case of accidental breakage, in the after use of the rim.

By reference to Figs. 3 and 6 in particular, it will be noted that the hinged sections 11 and 12 are of the same form, *i. e.* cross sectional shape as the main section 10, the hinged connections 13, 14 and 15 being formed by hinge bars 18 rigidly fastened along the side flanges of sections 11 and 12 as by means of brazing, acetylene welding and the like, so that the hinge connections are thus disposed at opposite sides of the completed rim which in consideration of certain other features of the construction to be now described, avoids all danger of lateral distortion and displacement of the main section 10, another disadvantage to which rims now in use are so often subject.

The inner ends of the hinged sections 11 and 12 have square faces which meet in the active position shown in Fig. 5, while their outer ends and the ends of the main section 10 have angular meeting faces 20.

The two ends of the main section 10 as well as the hinged sections 11 and 12 also have inwardly projecting lugs or pins 21 and 22, the pins 21 of section 10 having their inner heads tapered toward the extreme ends of the section and like the pins 22 of sections 11 and 12, have beveled side faces as seen in Fig. 6. Thus with as little materially weakening of the pins or lugs as possible, they are adapted for reception within the slots 23 of a locking plate 24, each of which slots has beveled side edges and communicates at one end with an opening 25 of slightly greater diameter than the pins or lugs. In addition to the slots 23 and openings 25, the locking plate 24 has a single opening 26 adjacent to one end, to spring over one of the pins or lugs 21 when the other pin or lug 21 and the pins or lugs 22 are at the ends of the slots 23 as will be seen by a comparison of Figs. 3 and 5.

Thus in releasing the locking bar or plate 24 it is simply necessary to raise one end thereof adjacent to the opening 26 upon which the bar may be shifted longitudinally until the other pins or lugs are in the openings 25, the locking plate being then removed. Upon removal of the locking plate, it is simply necessary to flex the hinged sections 11 and 12 inwardly by pressing inwardly against the hinge connections 13, in order to move the parts to the inactive position shown in Fig. 4, wherein the reduced circumference of the rim permits the tire to be readily removed and another tire placed on the rim. The hinge sections 11 and 12 are then flexed outwardly by pressing with one foot for instance upon their inner connected ends in order to force them outwardly to the active position shown in Figs. 1, 3 and 5, after which the locking plate 24 is placed as shown and described in order to rigidly lock the rim parts in the active position and brace them against distortion or displacement.

It will be noted that the locking plate or bar 24 is reversible and may be readily placed in and removed from active position and that the shifting of the rim parts into and out of active position may be accomplished without the necessity of special tools or implements and by the use only of a screw driver and the like, and possibly a hammer.

I claim:—

1. A demountable rim, consisting of a main section, a pair of inwardly yieldable sections of similar construction hingedly connected to one another at their inner adjacent ends and similarly connected at their outer ends to the ends of the main section, said yieldable sections and said main section having inward projections, and locking means to engage and connect said projections.

2. A demountable rim, consisting of a main section, a pair of inwardly yieldable sections of similar construction hingedly connected to one another at their inner adjacent ends and similarly connected at their outer ends to the ends of the main section, said hinged sections and said main section having inwardly projecting lugs and a single slotted locking plate having means to engage said lugs as described.

3. A demountable rim comprising a main section, and a pair of hinged sections having yieldable connections with one another and with the main section, said hinged sections and the ends of the main section having inwardly projecting lugs provided with undercut sides and a spring locking plate having slots provided with beveled side edges to engage the undercut sides of the lugs of said hinged sections and one of the lugs of the main section, and provided with openings at the ends of said slots and another opening, the latter of which receives the other lug of the main section.

4. A demountable rim comprising a main section, and a pair of hinged sections having yieldable connections with one another and with the main section, said hinged section and the ends of the main section having inwardly projecting lugs provided with undercut sides and a spring locking plate having slots provided with beveled side edges to engage the undercut sides of the lugs of said hinged sections, and one of the lugs of the main section, and provided with openings at the ends of said slots and opening the latter of which receives the other lug of the main section, said lugs and said slots and openings of the locking plate being equally spaced to permit of the reversal of the locking plate, as described.

In testimony whereof I affix my signature.

WILLIAM ISAAC HARP.